(12) United States Patent
Coatney et al.

(10) Patent No.: US 8,612,678 B2
(45) Date of Patent: Dec. 17, 2013

(54) CREATING LOGICAL DISK DRIVES FOR RAID SUBSYSTEMS

(75) Inventors: Doug Coatney, Sunnyvale, CA (US); Radek Aster, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 757 days.

(21) Appl. No.: 12/112,686

(22) Filed: Apr. 30, 2008

(65) Prior Publication Data

US 2009/0276566 A1     Nov. 5, 2009

(51) Int. Cl.
*G06F 12/00*     (2006.01)

(52) U.S. Cl.
USPC .................................. 711/114; 711/E12.069

(58) Field of Classification Search
USPC ......................................................... 711/114
See application file for complete search history.

(56) References Cited

U.S. PATENT DOCUMENTS

| | | | |
|---|---|---|---|
| 5,860,079 A * | 1/1999 | Smith et al. ................... | 713/100 |
| 6,853,546 B2 * | 2/2005 | Rabinovitz ............... | 361/679.02 |
| 7,401,193 B1 * | 7/2008 | Ye et al. ......................... | 711/162 |
| 2005/0182898 A1 | 8/2005 | Davis et al. | |
| 2006/0179209 A1 | 8/2006 | Wang et al. | |
| 2006/0242382 A1 | 10/2006 | Griess et al. | |
| 2007/0130424 A1 * | 6/2007 | Hashimoto et al. ........... | 711/114 |

OTHER PUBLICATIONS

Creating RAID 50 Volumes How to combine 2 or more MeraRAID SATA adpters into 1 OS RAID 50 volume [downloaded from www.lsi.com/downloads/Public/Obsolete/Obsolete%Common%20Files/rsa_os5Ovolume1103.pdf] Nov. 2003.*
International Search Report PCT/US2009/042414 dated Dec. 24, 2009, pp. 1-3.
Written Opinion PCT/US2009/042414 dated Dec. 24, 2009, pp. 1-4.

* cited by examiner

*Primary Examiner* — Reginald Bragdon
*Assistant Examiner* — Hamdy S Ahmed
(74) *Attorney, Agent, or Firm* — Perkins Coie LLP

(57) ABSTRACT

A computer storage system includes multiple disk trays, each disk tray holding two or more physical disks. The disks on a single tray are virtualized into a single logical disk. The single logical disk reports to the RAID (redundant array of inexpensive disks) subsystem, creating the impression that there is one large capacity disk. In one implementation, each disk in the tray is allocated to a different RAID group. By allocating the disks in a tray to different RAID groups, if the tray is removed, only a portion of several different RAID groups are removed. This arrangement permits a simple reconstruction of the RAID groups if a disk tray is removed from the system.

23 Claims, 4 Drawing Sheets

CREATING LOGICAL DISK DRIVES FOR RAID SUBSYSTEMS

FIELD OF INVENTION

The present invention generally relates to computer storage systems, and more particularly, to a method for creating logical disk drives for RAID subsystems.

BACKGROUND

Using RAID (redundant array of inexpensive disks) improves fault tolerance and performance of disks. An exemplary RAID system 100 is shown in FIG. 1. A RAID array 102 consists of a plurality of disks 104, 106, 108, 110.

One example of a RAID system is a RAID4, which is a form of RAID where the data is striped across multiple data disks to improve performance, and an additional parity disk is used for error detection and recovery from a single disk failure. An example of RAID4 striping is shown in FIG. 2. A RAID 200 includes a plurality of data disks 202, 204, 206, 208, and a parity disk 210. The lettered portion of each disk 202-208 (e.g., A, B, C, D) is a "stripe." To the user of the RAID 200, the RAID 200 appears as a single logical disk with the stripes laid out consecutively (A, B, C, etc.). A stripe can be any size, but generally is some small multiple of the disk's block size. In addition to the stripe size, a RAID4 system has a stripe width, which is another way of referring to the number of data disks, and a "slice size", which is the product of the stripe size and the stripe width. A slice 220 consists of a data stripe at the same offset on each disk in the RAID and the associated parity stripe. Performance is improved because each disk only has to record a fraction (in this case, one fourth) of the data.

Removing and replacing a single disk from a RAID group triggers a reconstruction of the data that was on the removed disk. This data is reconstructed onto the replacement disk using the remaining data disks in the RAID group and the parity disk block by block. If a large disk is removed or a RAID group with a large number of disks has one disk removed, the reconstruction operation can be costly in terms of the time needed to reconstruct the removed disk and the processing resources used during the reconstruction operation. This problem is compounded in a storage system where multiple disks are located on a single carrier, such that all of the disks on the carrier are removed at the same time even if only one of the disks needs to be replaced.

SUMMARY

When building storage systems, it is possible to build a tray (also referred to as a sled or a carrier) that has multiple disks associated with it. It is noted that while the storage systems described herein include disks, one skilled in the art can construct similar storage systems with other types of storage devices, such as solid state devices. One solution to the above-identified problem is to make the tray, even though it has individual physical disks, appear as one large logical disk. This essentially presents the tray as a LUN (logical unit number) or some other construct that is independent of the other trays.

For example, a drive environment has 48 disks located on 16 trays of three disks each. Instead of seeing 48 disks, the RAID would see 16 logical disks which are just larger; i.e., each logical disk has three times the capacity of any one physical disk. Each tray of three disks is sequentially addressed and the system software maps those three disks onto a single logical disk. The single logical disk reports to the RAID subsystem, creating the impression that there is one large capacity disk. When the RAID subsystem starts to write data, it writes it to a logical block address (LBA) range which is three times the space of one of the physical disks. The storage subsystem interprets the LBA range to be accessed as being on the first disk, on the second disk, spanning the first disk and the second disk, on the third disk, etc.

In one implementation, each disk in the tray is allocated to a different RAID group. This is beneficial because if, for example, each disk in the tray is a one terabyte disk, the system would start to reconstruct multiple terabyte volumes to reconstruct a RAID group because one failed disk was removed, resulting in a large waste of time and system resources.

By allocating the disks in a tray to different RAID groups, if the tray is removed, only a portion of several different RAID groups are removed. If the system has the capability to copy data from the "good" disks (i.e., the other disks on the tray that have not failed), called rapid RAID recovery, the system can attempt to copy the data directly off of the "good" disks to another tray. The system would then be up and running in less time and would be able to handle dense storage trays being plugged in and out of the RAID array.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

In order to create a dense storage system, trays of one, two, or three disks are used that could be removed at one point in time for replacement. This arrangement permits the disks to be placed into a standard 4U type of shelf. This type of physical layout makes the disks individually accessible. If a disk needs to be replaced, the entire tray of disks including the disk to be replaced needs to be removed to be able to disconnect the one disk. For example, in a 48 disk unit, three or four disks would have to be removed at once if one disk had to be replaced.

When a tray is removed, access to all disks on the tray is lost. For a RAID subsystem, removing multiple disks presents a problem. For example, assume that a tray is removed that has four disks on it and that the RAID has striped the data so that multiple RAID groups are affected when the tray is removed. If that tray is replaced, then four disks are being replaced, which causes multiple RAID groups to be reconstructed and rebuilt in the worst case scenario. One way to reconstruct a disk missing from a RAID group (in the case of a RAID4 implementation, for example), is to use the remaining disks in the RAID group and the parity disk for the RAID group to regenerate the data on the missing disk block by block. This leads to large amounts of time and system resources being spent on the reconstruction operation. There is therefore a need for a method wherein a tray having multiple disks can be removed without causing multiple RAID groups to be reconstructed.

The present invention can be implemented in any storage environment where there is a physical carrier with two or more disks. It is noted that while the storage systems described herein include disks, one skilled in the art can construct similar storage systems with other types of storage devices, such as solid state devices.

In one embodiment, the disks on a single tray appear as one large logical disk, even though there are multiple physical disks on the tray. This arrangement presents the tray as a single LUN (logical unit number) that is independent of the other trays in the storage system. The single logical disk reports to the RAID subsystem, creating the impression that there is one large capacity disk. In one implementation, each disk in the tray is allocated to a different RAID group. By allocating the disks in a tray to different RAID groups, if the tray is removed, only a portion of several different RAID groups are removed.

Figure 1:
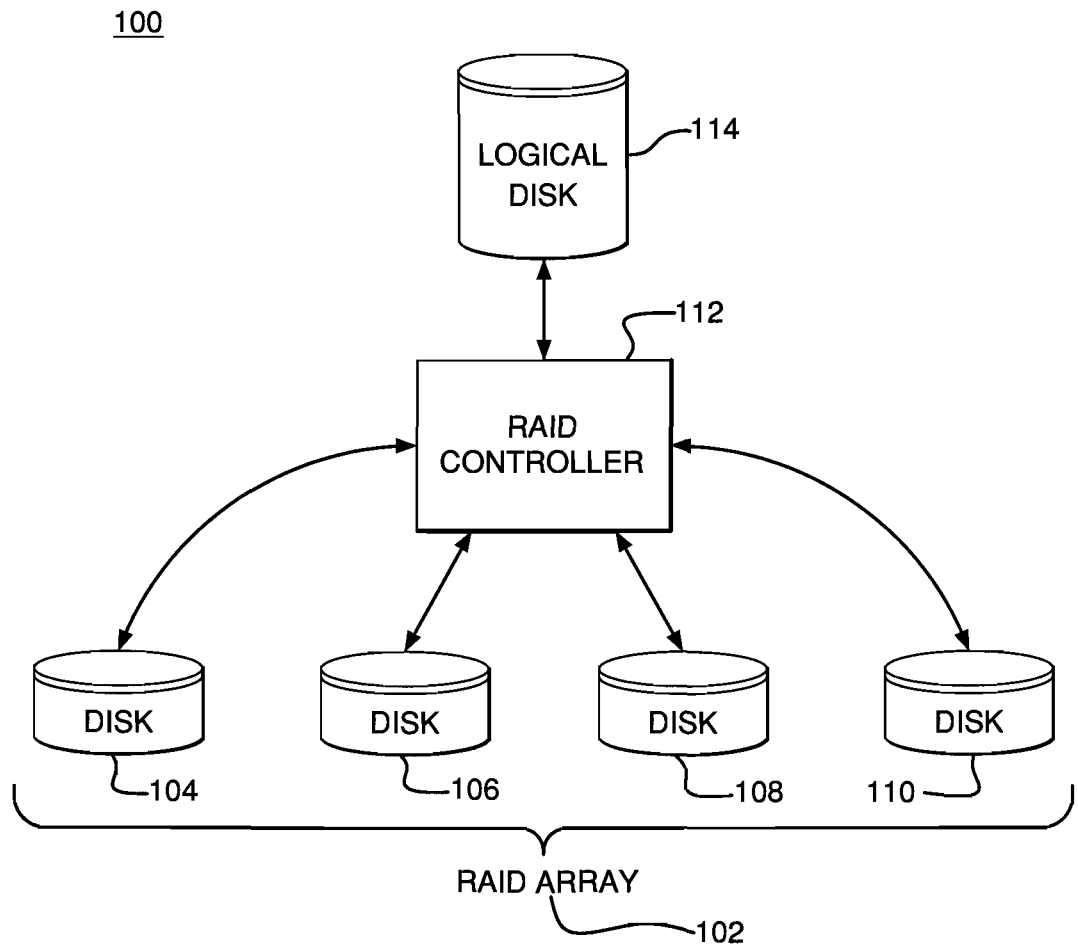
FIG. 1 is a diagram of a general RAID configuration.
Figure 2:
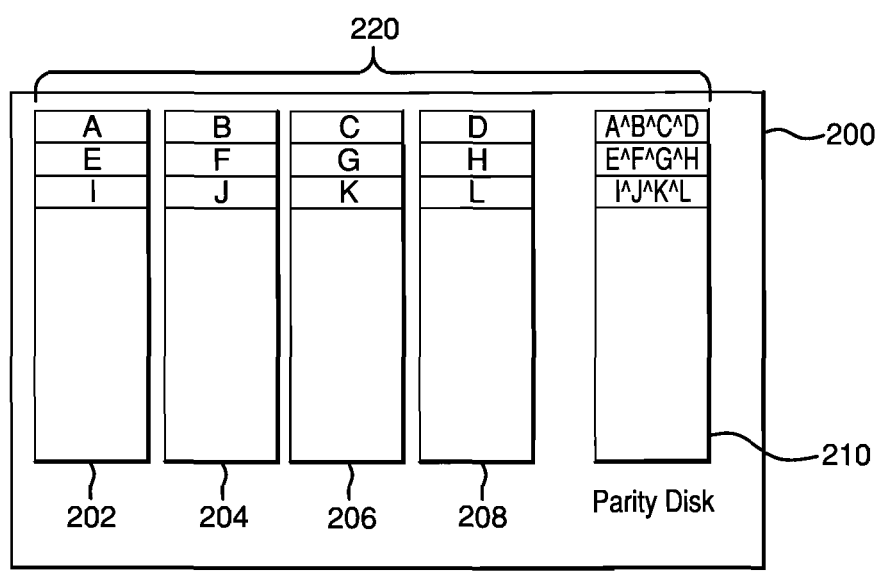
FIG. 2 is a diagram of a RAID4 system with striping and a parity disk.
Figure 3:
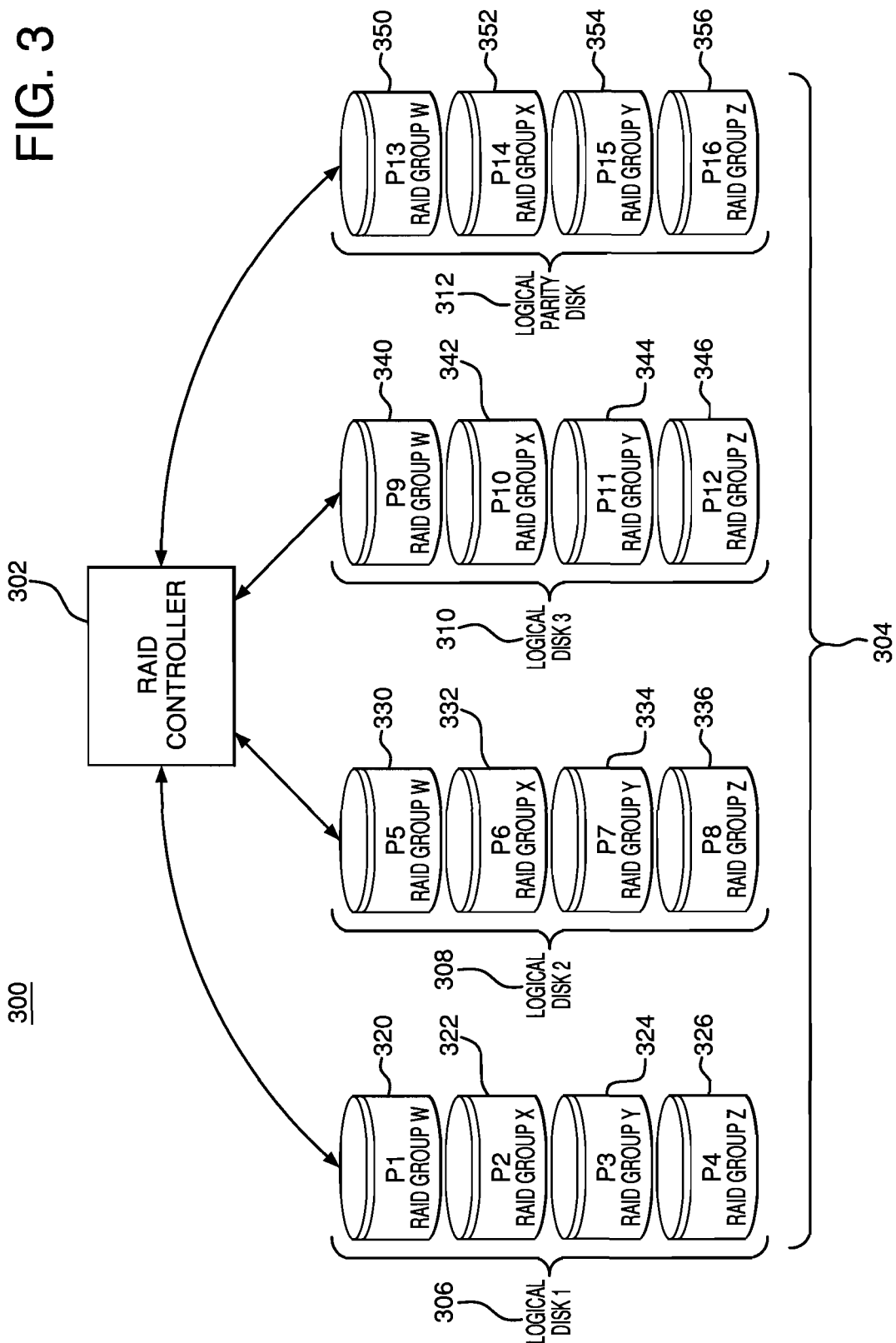
FIG. 3 is a diagram of a virtualized RAID configuration.

FIG. 3 is a diagram of a virtualized RAID configuration 300. A RAID controller 302 sees a RAID array 304 made up of logical disk 1 306, logical disk 2 308, logical disk 3 310, and a logical parity disk 312. Each of the logical disks 306-312 is a single disk tray consisting of four physical disks, such that logical disk 1 includes physical disks P1-P4 320-326, logical disk 2 includes physical disks P5-P8 330-336, logical disk 3 includes physical disks P9-P12 340-346, and the logical parity disk includes physical disks P13-P16 350-356. Which physical disks 320-356 belong to the logical disks 306-312 can be indicated by setting an identifier for each disk by a disk driver located on the filer.

The RAID controller 302 only sees the logical disks 306-312, and does not know that the physical disks 320-356 are present. The RAID controller 302 operates in the same manner as it would if there were only four physical disks connected to the controller. The number of physical disks per logical disk has no effect on the operation of the RAID controller 302. It is noted that while four physical disks are shown per logical disk, one skilled in the art can change the number of physical disks per logical disk without altering the operation of the RAID controller 302.

A RAID group can be created using one disk from each drive tray in the system. For example, RAID group W includes disks 320, 330, 340, and 350. Each logical disk spans several different RAID groups. For example, logical disk 306 includes a W RAID group disk 320, an X RAID group disk 322, a Y RAID group disk 324, and a Z RAID group disk 326.

The RAID groups are all in a normal RAID group situation, wherein all of the W disks are in one RAID group, all of the X disks are in a second RAID group, all of the Y disks are in a third RAID group, and all of the Z disks are in a fourth RAID group. If the disk tray that contains logical disk 306 is removed with one W disk, one X disk, one Y disk, and one Z disk on it, none of the RAID groups will become doubly degraded, e.g., the entire W RAID group is not removed.

When a disk tray is removed, the problem is that four different RAID groups have to be reconstructed. In other words, the W RAID group component, the X RAID group component, the Y RAID group component, and the Z RAID group component of the removed tray all need to be rebuilt. For example, assume that physical disk P4 326 (of the Z RAID group) is the physical disk on the tray that failed. Then information on the W RAID group disk 320, the X RAID group disk 322, and the Y RAID group disk 324 could be copied to other disks, instead of being reconstructed. The result of this copy operation is that the W RAID group, the X RAID group, and the Y RAID group could be reconstructed more easily because the missing data from the removed disks 320-324 would not have to be generated from corresponding the parity disks 350-354, and can just be copied.

However, virtualizing the RAID group and treating each WXYZ drive tray as a larger disk permits three quarters of the LBA range of the virtual disk to be copied to three quarters of the next logical disk. The operation is abstracted in a virtual sense, meaning that this is basically a copy operation—the information does not have to be reconstructed from a parity disk. Then the simplicity from the RAID group standpoint is that it would see fewer large disks. For example, instead of seeing 48 disks, the RAID would see 12 disks, wherein each disk seen by the RAID controller 302 is actually a disk tray with four physical disks.

To the RAID controller 302, it would look like it is communicating with a disk that has an LBA range of four times the size of any physical disk that was actually present. So the RAID would stripe the data across the logical disks that it is aware of. By viewing the physical disks on a tray as a single logical disk, the net effect is adding the LBA ranges of each disk together and the storage subsystem recognizing where a physical location relating to the LBA is; i.e., mapping multiple physical disks into a single logical disk for RAID access.

Presenting multiple physical disks as a single logical disk is the opposite of what is traditionally thought of as virtualization. This is virtualization within the RAID subsystem itself, whereas virtualization traditionally occurs external to the RAID subsystem. A RAID traditionally approaches virtualization from the opposite direction, by mapping multiple logical devices onto a single physical device.

When implementing the present invention, there is no change in the way the RAID operates. The abstraction is placed below the RAID, so that it is possible for the RAID to handle the removal of a larger number of disks in an easier manner for supportability. Then the RAID does not have to be concerned about the complexities of the layout, because it has already taken care of the layout through the virtualization.

Exemplary System Construction

Figure 4:
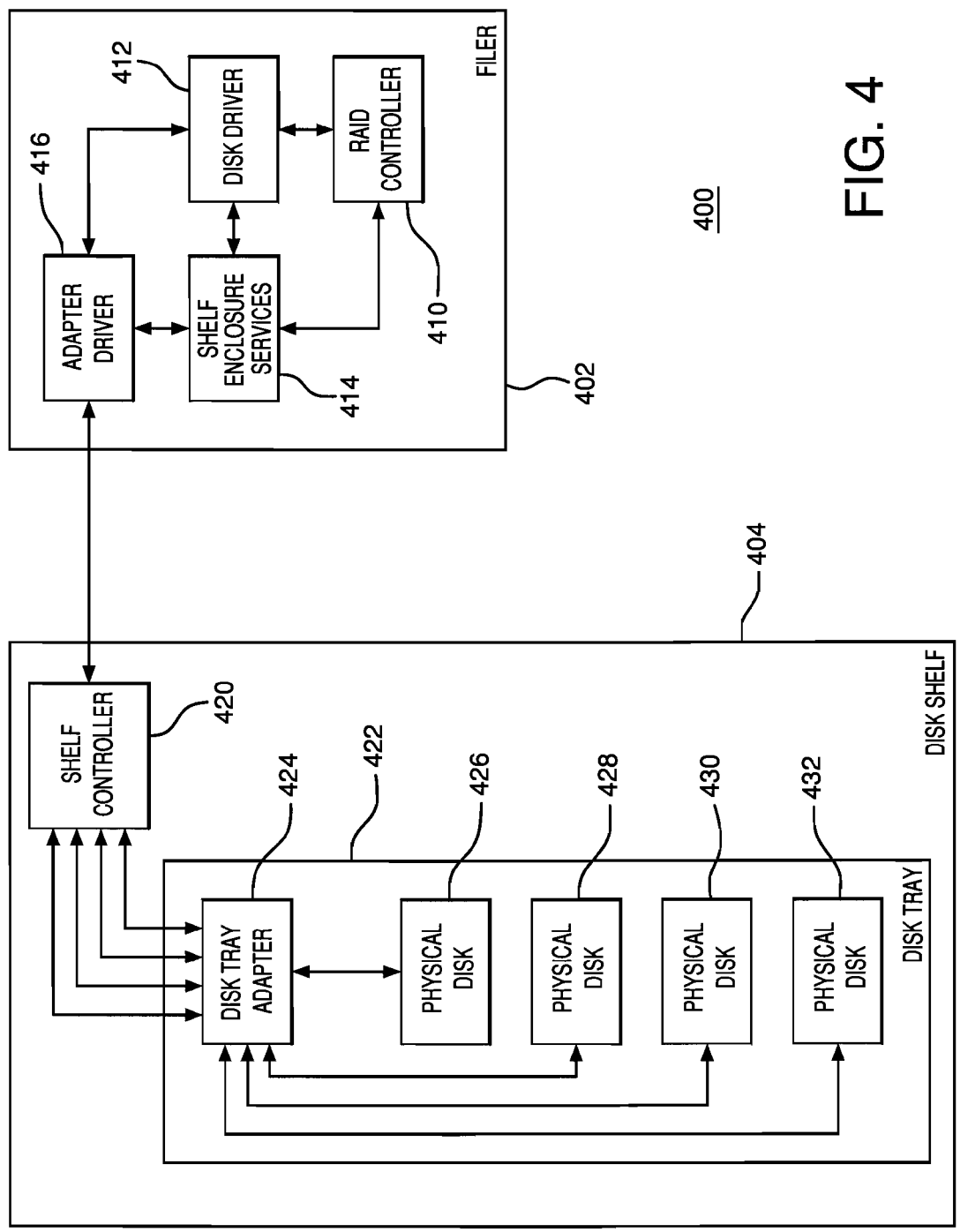
FIG. 4 is a block diagram of a system showing one disk tray and its connections to a RAID controller.

FIG. 4 is a block diagram of a portion of a system 400 configured to implement the present invention. The system 400 includes a filer 402 and a disk shelf 404. The filer 402 includes a RAID controller 410, a disk driver 412 in communication with the RAID controller 410, shelf enclosure services 414 in communication with the RAID controller 410 and the disk driver 412, and an adapter driver 416 in communication with the disk driver 412 and the shelf enclosure services 414. The disk shelf 404 includes a shelf controller 420 and a disk tray 422. The disk tray 422 includes a disk tray adapter 424 and a plurality of physical disks 426-432. The disk tray adapter 424 is in communication with each of the physical disks 426-432 and the shelf controller 420. The filer 402 communicates with the disk shelf 404 via communication between the adapter driver 416 and the shelf controller 420.

The disk driver 412 is the entity in the system 400 that provides the virtualization to the RAID controller 410. The shelf enclosure services 414 receives data from the shelf controller 420 about the configuration of the physical disks 426-432 on the disk shelf 404. The configuration information includes environmental information about the physical layout of the shelf and each disk on the shelf. In one implementation, each disk on the disk shelf 404 is uniquely identified by its physical connection to the shelf 404. For example, a single disk on the shelf 404 may be identified by the bay where it is physically located and an ID number of the shelf 404. The configuration information is provided to the disk driver 412, which uses the information to indicate which physical disks 426-432 on the disk shelf 404 belong to which logical drive(s). In one implementation, the disk driver 412 uses a table to track the assignment of a physical drive to a logical drive. It is noted that one skilled in the art can use other means of identifying each disk on the disk shelf and other means of tracking the assignment of physical disks to logical disks.

After the physical disks 426-432 are assigned to a logical disks, the disk driver 412 presents the logical disk to the RAID controller 410. The elements "above" the RAID controller 410 (i.e., the disk driver 412, the shelf enclosure services 414, and the adapter driver 416) treat the disks 426-432 as individual disk drives. The disk driver 412 provides the virtualization layer to the RAID controller 410, such that the RAID controller 410 only sees the logical disk. In the event that multiple disk trays 422 are present, the disk driver 412 presents multiple logical disks to the RAID controller 410.

It is noted that while only one disk tray 422 and one disk shelf 404 are shown, one skilled in the art can construct a similar system with multiple disk trays and/or multiple disk shelves. When more than one disk tray is present on a single disk shelf, each disk tray communicates with the shelf controller 420 in a similar manner as shown in FIG. 4. When more than one disk shelf is present in the system 400, the shelf controllers for each shelf are in communication with each other, in a cascading style such that only one shelf controller communicates directly with the adapter driver 416. It is also noted that while the disk tray 422 is shown with four physical disks 426-432, one skilled in the art can construct a similar disk tray with different numbers of physical disks.

It is further noted that while the system 400 illustrates a disk shelf, a disk tray, and multiple physical disks, a similar system can be built with other types of storage devices, such as solid state devices. In such circumstances, there would be a storage shelf, a storage tray, and multiple physical storage devices. The system 400 operates in a similar manner, regardless of the type of storage device used.

In operation, the RAID controller 410 sends an input/output (I/O) command to be performed on a logical disk of the RAID subsystem. It is noted that the following description relates to a single I/O command for simplicity; the system 400 operates in the same manner for any number of I/O commands issued by the RAID controller 410.

The disk driver 412 receives the command from the RAID controller 410 and determines which of the physical disks 426-432 should receive the command, based on the mapping of the logical disk to the physical disks 426-432. The disk driver 412 forwards the command along with the determined physical disk to the adapter driver 416. The adapter driver 416 forwards the command to the shelf controller 420, which passes the command to the disk tray adapter 424. The disk tray adapter 424 directs the command to the determined physical disk 426-432. Any response from the physical disk is passed in the reverse direction (through the disk tray adapter 424, the shelf controller 420, the adapter driver 416, and the disk driver 412) to the RAID controller 410.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A non-transitory storage medium storing a set of instructions for execution by a general purpose computer to create logical storage devices for a redundant array of inexpensive devices (RAID) group, the set of instructions comprising:
    a first creating code segment for creating at least one logical storage device, each logical storage device including two or more physical storage devices, such that said two or more physical storage devices are presented as a single logical storage device to a RAID controller, wherein a storage device driver determines which of said two or more physical storage devices belongs to the logical storage device, and determines which of said two or more physical storage devices is to receive a command sent by the RAID controller intended for the logical storage device such that the storage device driver virtualizes said two or more physical storage devices as one logical storage device to the RAID controller; and
    a second creating code segment for creating at least one RAID group, each RAID group including at least a portion of each of the at least one logical storage device.

2. The storage medium according to claim 1, wherein the first creating code segment includes providing an indicator for each physical storage device to indicate which logical storage device that each physical storage device is associated with.

3. The storage medium according to claim 1, wherein the second creating code segment includes striping data in the RAID group across each of the at least one logical storage device, such that one data stripe is located on several physical storage devices, each physical storage device being located on a different tray.

4. A system for creating and using a logical storage device in a redundant array of inexpensive devices (RAID) group, comprising:
    a storage file server, comprising:
        a RAID controller configured to send a command to the logical storage device;
        a storage device driver in communication with said RAID controller, said storage device driver configured to receive the command from said RAID controller;
    a tray, comprising:
        a tray adapter in communication with said storage device driver; and
        a plurality of storage devices on said tray, each of said plurality of storage devices in communication with said tray adapter, wherein one or more storage devices of said plurality of storage devices are mapped to the logical storage device by said storage device driver; and said storage device driver is configured to:
determine which of said plurality of storage devices belongs to the logical storage device; and determine which of said plurality of storage devices is to receive the command intended for the logical storage device such that said storage device driver virtualizes said plurality of storage devices as one logical storage device to the RAID controller.

5. The system according to claim 4, further comprising a shelf, comprising:
a shelf controller in communication with said storage device driver and said tray adapter; and
said tray.

6. The system according to claim 5, wherein said shelf comprises a plurality of trays.

7. The system according to claim 4, further comprising a plurality of shelves, each shelf comprising:
a shelf controller; and
one or more trays.

8. The system according to claim 7, wherein the shelf controller for each of said plurality of shelves communicates with the shelf controller on another of said plurality of shelves and one of the shelf controllers communicates with said storage file server.

9. The system according to claim 4, wherein said storage file server further comprises shelf enclosure services in communication with said RAID controller and said storage device driver, said shelf enclosure services configured to:
receive information from said shelf controller regarding a configuration of said plurality of said storage devices on said tray; and
forward the configuration information to said storage device driver.

10. The system according to claim 9, further comprising an adapter driver in communication with said storage device driver and said shelf enclosure services, said adapter driver configured to communicate with said shelf controller, said storage device driver, and said shelf enclosure services.

11. A method for performing a command on a logical storage device in a redundant array of inexpensive devices (RAID) subsystem, comprising the steps of:
mapping one or more physical storage devices to the logical storage device, such that the logical storage device includes an entirety of storage space on each of the one or more physical storage devices;
generating a command by a RAID controller, the command directed to the logical storage device wherein the RAID controller is unaware that the logical storage device is mapped to one or more physical storage devices;
processing the command by a storage device driver, the storage device driver determining a target physical storage device for the command such that the storage device driver virtualizes said physical storage devices as one logical storage device to the RAID controller;
receiving the command at a tray including the target physical storage device; and
performing the command on the target physical storage device.

12. The method according to claim 11, wherein the mapping step includes:
receiving information at the storage device driver from a shelf controller, the information relating to a configuration of the physical storage devices in communication with the shelf controller; and
mapping the physical storage devices to one or more logical storage devices based on the received information.

13. A method for creating logical disks for a redundant array of inexpensive disks (RAID) group, comprising the steps of:
providing a plurality of physical disk trays, each disk tray including two or more physical disks;
creating at least two logical disks, each logical disk including two or more physical disks;
creating at least one RAID group, each RAID group including at least a portion of each of the at least two logical disks, wherein a storage device driver determines which of said plurality of physical disks belongs to one individual logical disk of the at least two logical disks, and determines which of said plurality of physical disks is to receive a command sent by a RAID controller of the at least one RAID group intended for the individual logical disk such that said storage device driver virtualizes said plurality of physical disks as one logical disk to the RAID controller; and
striping data in each of the at least one RAID group across each of the at least two logical disks, such that one data stripe is located on different disk trays.

14. The method according to claim 13, wherein one RAID group is allocated to at least one physical disk on each disk tray.

15. The method according to claim 13, wherein creating the at least two logical disks includes providing an indicator for each physical disk to indicate which logical disk that each physical disk is associated with.

16. A method for creating logical storage devices for a redundant array of inexpensive devices (RAID) group, comprising:
employing a plurality of physical trays, each tray including two or more physical storage devices;
creating a first logical storage device, the first logical storage device including two or more physical storage devices;
creating a second logical storage device, the second logical storage device including two or more physical storage devices;
creating at least one RAID group, the first RAID group including at least one of the two or more physical storage devices of the first logical storage device and at least one of the two or more physical storage devices of the second logical storage device; and
striping data in the at least one RAID group across said first and said second logical storage device, such that each physical storage device within a logical storage device is allocated to a different RAID group
wherein the at least one RAID group includes a RAID controller configured to send a command to the first logical storage device, and a storage device driver configured to determine which of said physical storage devices belongs to the first logical storage device and to determine which of said physical storage devices is to receive the command intended for the first logical storage device such that said storage device driver virtualizes at least a portion of said physical storage devices as one logical storage device to the RAID controller.

17. The method of claim 16, wherein the creating at least one RAID group step includes creating a second RAID group, the second RAID group including at least one of the two or more physical storage devices of the first logical storage device and at least one of the two or more physical storage devices of the second logical storage device.

18. The method of claim 17, further comprising: copying at least a portion of data stored in the first logical storage device to the second logical storage device.

19. The method of claim 16, further comprising:
upon removing one of the plurality of physical trays, copying at least a portion of data stored in the first logical storage device; and
reconstructing data in at least one of the two or more physical storage devices of the first logical storage device.

20. A method comprising:
presenting a plurality of storage devices as a single logical unit to a RAID controller that controls a RAID subsystem, such that the RAID controller is not aware of the individual storage devices in the single logical unit; and
assigning each of a plurality of portions of the single logical unit to a different RAID group of a plurality of RAID groups in the RAID subsystem, wherein each of the plurality of portions of the single logical unit is a different storage device of the plurality of storage devices
wherein a storage device driver determines which of said plurality of storage devices belongs to the single logical unit, and determines which of said plurality of storage devices is to receive a command sent by the RAID controller intended for the single logical unit such that said storage device driver virtualizes said plurality of storage devices as one logical unit to the RAID controller.

21. The method of claim 20, further comprising:
forming the plurality of RAID groups from separate pluralities of storage devices to define a plurality of logical units, wherein each of the logical units includes only a portion of each of the RAID groups, and each RAID group includes only a portion of each of the logical units.

22. The method of claim 20, wherein the single logical unit of the plurality of storage devices in the RAID subsystem is installed on a single physical tray.

23. A method comprising:
in a storage system, presenting a plurality of storage devices on a single physical carrier as a first logical unit to a RAID controller that controls a RAID subsystem, such that the RAID controller is not aware of the individual storage devices in the first logical unit, wherein a storage device driver determines which of said plurality of storage devices belongs to the first logical unit, and determines which of said plurality of storage devices is to receive a command sent by the RAID controller intended for the first logical unit such that said storage device driver virtualizes said plurality of storage devices as one logical unit to the RAID controller;
assigning each of a plurality of portions of the first logical unit to a different RAID group of a plurality of RAID groups in the RAID subsystem, each said RAID group including at least a portion of a second logical unit which is distinct from the first logical unit;
in response to a failure of one of the storage devices in the first logical unit, copying contents of each other storage device in the first logical unit to one or more other logical units, prior to removing the single physical carrier from the storage system; and
after reinstalling the single physical carrier in the storage system, reconstructing data on the first logical unit by copying data from said one or more other logical units back to said first logical unit, without reconstructing all of the plurality of RAID groups.

* * * * *

UNITED STATES PATENT AND TRADEMARK OFFICE
CERTIFICATE OF CORRECTION

PATENT NO. : 8,612,678 B2  
APPLICATION NO. : 12/112686  
DATED : December 17, 2013  
INVENTOR(S) : Doug Coatney et al.

Page 1 of 1

It is certified that error appears in the above-identified patent and that said Letters Patent is hereby corrected as shown below:

On the title page, item (56) References Cited, in column 2, under "Other Publications", line 2, delete "adpters" and insert -- adapters --, therefor.

Signed and Sealed this
Fifteenth Day of April, 2014

Michelle K. Lee
*Deputy Director of the United States Patent and Trademark Office*